United States Patent
Izumisawa

(10) Patent No.: US 7,656,549 B2
(45) Date of Patent: Feb. 2, 2010

(54) IMAGE FORMING APPARATUS

(75) Inventor: Souichi Izumisawa, Tagata-gun (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 850 days.

(21) Appl. No.: 11/277,089

(22) Filed: Mar. 21, 2006

(65) Prior Publication Data
US 2009/0257075 A1    Oct. 15, 2009

(51) Int. Cl.
G06F 3/12 (2006.01)
H04N 1/00 (2006.01)
H04N 1/32 (2006.01)
H04M 11/00 (2006.01)

(52) U.S. Cl. ............ 358/1.15; 358/400; 358/402; 358/405; 358/407; 358/468; 379/100.01; 379/100.05; 379/100.08; 379/100.09

(58) Field of Classification Search ............ 358/1.15, 358/400, 402, 405, 407, 468; 379/100.01, 379/100.05, 100.08, 100.09
See application file for complete search history.

(56) References Cited

U.S. PATENT DOCUMENTS 5,448,626 A * 9/1995 Kajiya et al. ........... 379/88.13
6,741,370 B1 * 5/2004 Kakoi ..................... 358/468
7,006,259 B1 * 2/2006 Takaoka .................. 358/405

OTHER PUBLICATIONS

Izumisawa, Souichi, Pending U.S. Appl. No. 11/165,790, filed Jun. 23, 2005.

* cited by examiner

Primary Examiner—Edward L Coles
Assistant Examiner—Charlotte M Baker
(74) Attorney, Agent, or Firm—Patterson & Sheridan, LLP

(57) ABSTRACT

When received facsimile data is TSI-transferred, an image forming apparatus selects one box from a table which includes at least one of a box to which a number of a transmission source is assigned as a name and a box to which a part of a number of a transmission source and a symbol attached to the front or last of the number are assigned as a name. In the case where the selected box has the name in which the symbol is added to the front of the part of the number, a last number of a number indicated by data included in the TSI, which has the number of digits identical to those of the part of the number, is compared with the part of the number for all digits. As a result of the comparison, in the case where they match each other, the apparatus transfers the received facsimile data according to transfer setting of the box.

20 Claims, 7 Drawing Sheets

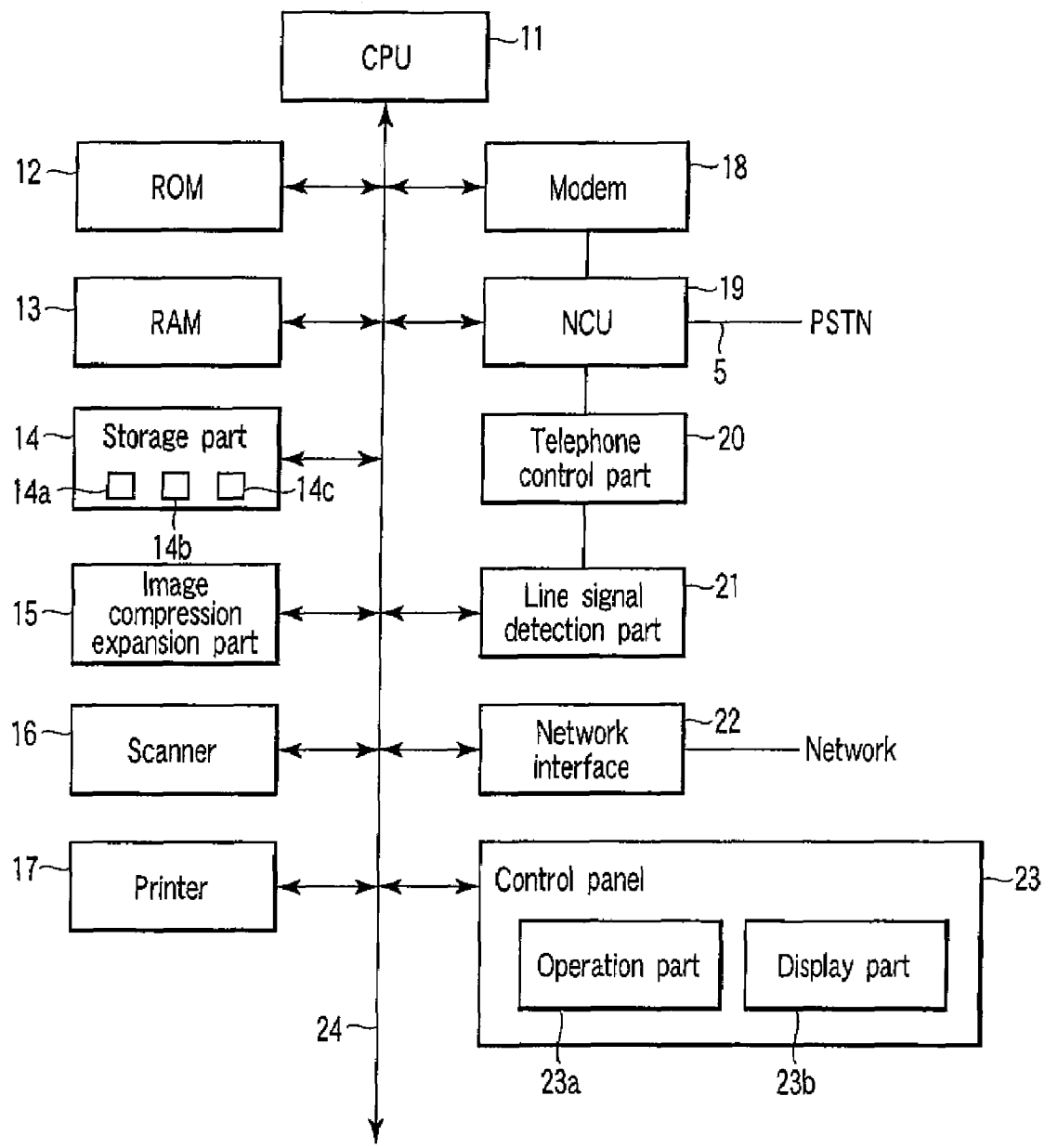
F I G. 2

Transfer setting for each transmission source
1. Transfer box creation
2. Transfer box setting change
3. Transfer box delete

FIG. 3

Please insert box number:

Please select comparison method to transfer source:
1. Complete match
2. Forward match (XXX*)
3. Backward match (*XXX)

FIG. 5

Please input transfer destination:
1. FAX
2. i FAX
3. E-mail
4. File storage

FIG. 6

| Box number | Transfer kind | Transfer destination | Reception print |
|---|---|---|---|
| 0331554444 | e-mail | xxx@xxx.co.jp | Performed |
| *8899 | File storage | //tfp_sp | Not performed |
| 033123* | File storage | //tfp_A | Not performed |
| 033124* | File storage | //tfp_B | Not performed |

FIG. 10

IMAGE FORMING APPARATUS

BACKGROUND OF THE INVENTION

1. Field of the Invention

The present invention relates to an image forming apparatus which transfers facsimile data received from outside.

2. Description of the Related Art

Image forming apparatuses having a facsimile function, such as a multi-function peripheral (MFP), are known. Some of such image forming apparatuses have a function to transfer received facsimile data to a fax, an image forming apparatus or the like. The transfer of the facsimile data is performed by using a box to which a previously determined specific number with, for example, 20 digits or less is assigned as a name and in which a transfer destination of facsimile data is set. Specifically, the specific number is added to the facsimile data by an operator of a transmission source apparatus and is transmitted. An image forming apparatus having received the facsimile data transfers the received facsimile data based on the transfer setting of the box to which the specific number is assigned as the name.

In the case where the operator adds the specific number at the time of facsimile transmission as stated above, the operation at the time of facsimile transmission becomes troublesome. Thus, there has also been proposed to use transmission subscriber identification (TSI) data added to facsimile data. That is, when an image forming apparatus receives the facsimile data, in the case where a number included in the TSI data added to the facsimile data and indicating a transmission source completely matches a number assigned as a name of a box, the received facsimile data is transferred based on the transfer setting set in the box.

However, in the TSI data, there are a case where a character other than a number is included, a case where a telephone number of a transmission source including the country code is indicated, and the like. Besides, there is also a case where a number in which the area code is omitted is registered as the name of the box. In such a case, since the number previously assigned as the name to the box does not completely match the number included in the TSI data, the facsimile data can not be transferred.

That is, when facsimile data is transferred using the TSI data, there is a situation where, when the number assigned as the name to the box does not completely match the number included in the TSI data, the facsimile data can not be transferred based on the transfer setting set in the box.

BRIEF SUMMARY OF THE INVENTION

An object of the invention is to provide an image forming apparatus in which even if a number assigned as a name to a box does not completely match a number included in TSI data, received facsimile data can be transferred based on transfer setting set in the box under a specific rule.

According to an aspect of the invention, an image forming apparatus includes a first judgment part configured to judge whether a transfer function based on transmission subscriber identification data is effective when facsimile data to which transmission subscriber identification data is added is received, a second judgment part configured to judge whether, when the first judgment part judges that the transfer function is effective, at least one box is registered in a table that stores a box to which a number indicating an identification number of a transmission source is assigned as a name and in which transfer setting of the facsimile data is associated therewith and is stored, and a box to which a number indicating a part of an identification number of a transmission source and a specified symbol added to the front or last of the number are assigned as a name and in which transfer setting of the facsimile data is stored, a selection part configured to select one box from the table in a case where the second judgment part judges that the box is registered in the table, a third judgment part configured to judge whether the symbol is included in the name of the box selected by the selection part, a first comparison part configured to compare the identification number of the transmission source as the name of the selected box with a number indicated by the transmission subscriber identification data for all digits when the third judgment part judges that the symbol is not included, a fourth judgment part configured to judge whether the symbol is added to the front or the last of the number assigned as the name to the selected box and indicating the part of the identification signal of the transmission source when the third judgment part judges that the symbol is included, a second comparison part configured to compare the number indicating the part of the identification signal of the transmission source with a last number of the number indicated by the transmission subscriber identification data for same digits as those of the number indicating the part of the identification signal when the fourth judgment part judges that the symbol is added to the front of the number indicating the part of the identification signal of the transmission source, and a transfer part configured to transfer the received facsimile data according to transfer setting of the selected box in a case where the compared numbers match each other based on a comparison result in the first comparison part or the second comparison part.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing a main structure of an MFP in the embodiment.

FIG. 3 is a view showing a display example of a display part when an operator starts transfer setting in the embodiment.

FIG. 4 is a view showing a display example of the display part when a box number is set in the embodiment.

FIG. 5 is a view showing a display example of the display part when a comparison method to a transfer source is set in the embodiment.

FIG. 6 is a view showing a display example of the display part when a transfer destination is set in the embodiment.

FIG. 10 is a table in which a box number and transfer setting are associated with each other and are stored in the embodiment.

DETAILED DESCRIPTION OF THE INVENTION

Hereinafter, an embodiment of the invention will be described with reference to the drawings.

Figure 1:
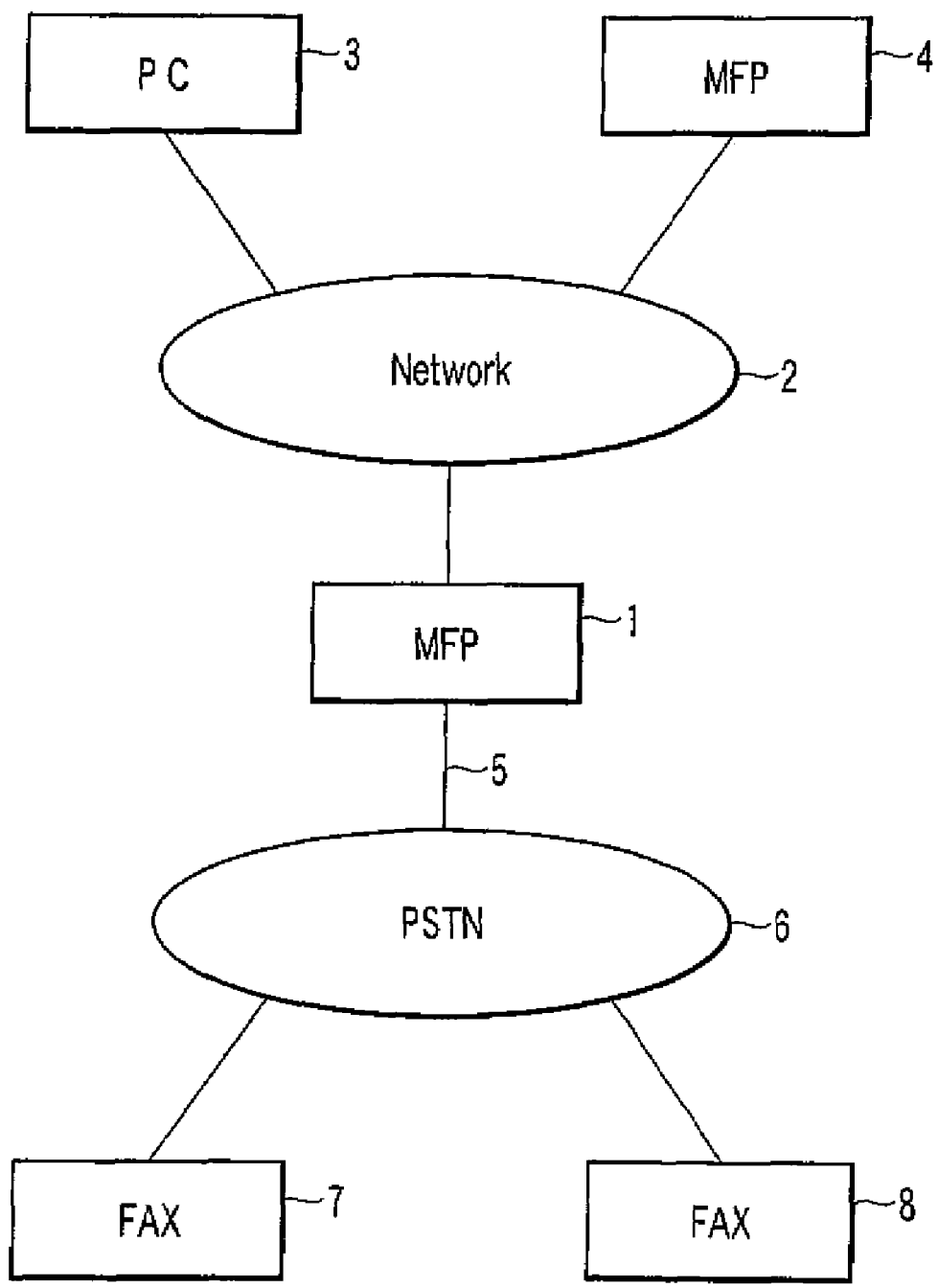
FIG. 1 is a view schematically showing a network structure in a first embodiment of the invention.

FIG. 1 is a view schematically showing a network structure to which a multi-function peripheral (MFP) 1 is connected. The MFP 1 is a multi-function printer having a facsimile function, a printer function, a copy function, a scanner function, a network function and the like. As shown in FIG. 1, the MFP 1 is connected to a PC 3 and an MFP 4 through a network 2. The address of the PC 3 on the network 2 is "xxx@xxx.co.jp". Although the network 2 may be the Internet, it is made a local area network. Besides, in this embodiment, a description will be given to a case where the number of PCs 3 and that of MFPs 4 connected to the network 2 to which the MFP 1 is connected are respectively one. However, the number of the PCs 3 and that of the MFPs 4 are not limited to this.

The MFP 1 is connected to a public switched telephone network (PSTN) 6. A fax 7 and a fax 8 are connected to the PSTN 6. When facsimile data is transmitted, the faxes 7 and 8 transmit data indicating a telephone number (including the country code) as transmission subscriber identification (TSI) data. Incidentally, there is also a case where the TSI data includes not only the telephone number but also data such as characters. The number and the like (option according to the ITU recommendation) included in the TSI data are displayed on a display by a reception side device or are printed on a reception management report and are utilized. Incidentally, a description will be given to a case where two faxes of the fax 7 and the fax 8 are connected to the PSTN 6. However, the number of faxes is not limited to this.

FIG. 2 is a block diagram showing the main structure of the MFP 1. The MFF 1 includes a CPU 11, a ROM 12, a RAM 13, a storage part 14, a data conversion part 15, a scanner 16, a printer 17, a modem 18, an NCU 19, a telephone control part 20, a line signal detection part 21, a network interface 22, and a control panel 23.

The CPU 11, the ROM 12, the RAM 13, the storage part 14, the data conversion part 15, the scanner 16, the printer 17, the modem 18, the NCU 19, the line signal detection part 21, the network interface 22, and the control panel 23 are connected to one another through a bus line 24. The modem 18 and the telephone control part 20 are connected to the NCU 19. Further, the line signal detection part 21 is connected to the telephone control part 20.

The CPU 11 realizes an operation as the MFP 1 by performing a processing to control the respective parts based on a control program (for example, an after-mentioned transfer processing of facsimile data) stored in the ROM 12. The ROM 12 stores the control program of the CPU 11 and the like. The RAM 13 is used as a work area for storing various information required for the CPU 11 to perform various processings.

The storage part 14 is, for example, a hard disk drive (HDD). The storage part 14 is provided with an area in which image data is temporarily stored, an area in which a table 14a is stored, an area in which a first setting part 14b and a second setting part 14c are stored, and the like. The table 14a is a box table to store setting concerning a box for transferring received facsimile data. The first setting part 14b includes setting to transfer received facsimile data to a certain transfer destination without variation, and setting as to whether printing is to be performed at that time. In the second setting part 14c, it is set whether a TSI transfer function to perform a transfer using the table 14a is made effective. The settings of the first setting part 14b and the second setting part 14c are performed by the user's operation of the control panel 23.

The data conversion part 15 performs an encoding processing for redundancy compression on image data, and decodes image data in which encoding for redundancy compression has been performed.

The scanner 16 reads a transmission document and creates image data indicating the transmission document.

The printer 17 prints an image indicated by the image data onto a recording sheet.

The modem 18 modulates the image data to generates a facsimile transmission signal, and modulates a command given from the CPU 11 to generate a command transmission signal. The modem 18 transmits these transmission signals to a PSTN subscriber line 5 through the NCU 19. Besides, the modem 18 demodulates a facsimile transmission signal arriving through the PSTN subscriber line 5 and given through the NCU 19 and reproduces the image data, or demodulates the command transmission signal to reproduce a command.

The PSTN subscriber line 5 contained in the PSTN 6 is connected to the NCU 19. The NCU 19 performs state monitoring, transmission processing to a net, and the like in relation to the connected PSTN subscriber line 5. Besides, the NCU 19 performs the setting of a level of a facsimile transmission signal to be transmitted to the PSTN subscriber line 5. An external telephone is connected to the telephone control part 20 as the need arises. The line signal detection part 21 receives a signal, which arrives through the PSTN subscriber line 5, through the NCU 19 and the telephone control part 20, and detects the arrival of the specified signal.

The network interface 22 is used for the connection to the network 2. The network interface 22 performs data transmission through the network 2.

The control panel 23 includes an operation part 23a for receiving user's various instruction inputs to the CPU 11, and a display part 23b for displaying various information to be notified to the user under control of the CPU 11. Incidentally, numeric keys of 0 to 9 for entering numbers, a determination key for determining registration of the inputted data to the table 14a, and the like are arranged in the operation part 23a.

Next, the table 14a created in the storage part 14 will be described. This table 14a is used for transferring received facsimile data by using a number included in the TSI data. A box is registered in the table 14a. As the name of the box, a telephone number of a transmission source of the facsimile data is assigned as the name, and correspondingly to the name (that is, the box number) of the box, the kind of transmission, a transmission destination, and print setting are stored.

Subsequently, an example of an operation at the time when a box to be registered in the table 14a is created will be described by use of FIG. 3 to FIG. 9.

First, the user operates the operation part 23a of the control panel 23, and activates a screen for performing transfer setting for each transfer source on the display part 23b. Then, "1. box creation", "2. box setting change", "3, box delete" are displayed on the display part 23b (FIG. 3).

After the user operates the operation part 23a to select "1", the telephone number of the transmission source is set as the name of the box. That is, the telephone number of the transmission source, which transmits facsimile data whose transfer is desired by the user, is set. For example, in the case where the facsimile data from the transmission source having a telephone number of "0331232567" is desired to be transferred, the number is set. At this time, in the case where the user desires to perform the transfer by the TSI function only when the number included in the TSI data completely matches the telephone number, the telephone number "0331232567" is set.

In the case where the user desires to perform the transfer by the TSI function in the case where the number included in the TSI data and the telephone number match each other for a specific number of first digits, the first number of the telephone number with the specific number of digits is set. The first number with the specific number of digits is set so as to correspond to the digits of, for example, the city code, the country code or the like. For example, when "033123" of the telephone number is the area code, "033123" is set (FIG. 4).

Further, in the case where the user desires to perform the transfer by the TSI function in the case where the number included in the TSI data and the telephone number match each other for a specific number of last digits, the specific number of last digits of the telephone number are set. For example, "31232567" of the telephone number is set.

As stated above, after the user inputs the telephone number as the box number, the user makes an input through the determination key of the operation part 23a, so that the name of the box is determined. Then, a screen for selection of a comparison method to a transfer source is displayed on the display part 23b. On this display part 23b, "1. complete match", "2. forward match (XXX*)", "backward match (*XXX)" are displayed (FIG. 5). The user selects a number according to the intension of the name of the box inputted as set forth above. That is, in the case where the complete match between the number included in the TSI data and the name of the box is desired, "1" is selected, in the case where the forward match is desired, "2" is selected, and in the case where the backward match is desired, "3" is selected.

When the selection of the comparison method is determined by the user's operation of the operation part 23a as stated above, a screen for the input of a transfer destination is displayed on the display part 23b. On this display part 23b, "1. FAX", "2. iFAX", "3. E-mail" and "4. file storage" are displayed (see FIG. 6). For example, in the case where the user desires to transfer the received facsimile data as E-mail, "3. E-mail" is selected. In the case where the user desires to transfer the received facsimile data so that it is stored in a file, "4. file storage" is selected.

Figure 7:
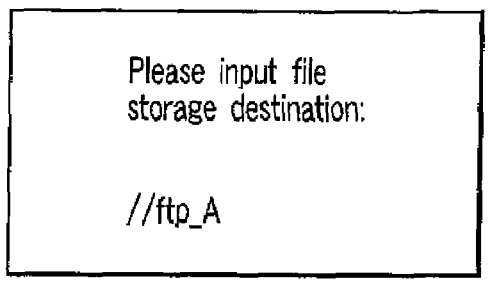
FIG. 7 is a view showing a display example of the display part when a storage destination is set in the embodiment.

When the transfer destination is determined by the user's operation of the operation part 23a, a screen for the setting of the storage destination is displayed on the display part 23b. For example, in the case where the file storage is selected as the transmission destination, a message screen "Please input a file storage destination." is displayed on the display part 23b (FIG. 7). Then, the user inputs the storage destination. For example, "//ftp_A" is inputted.

Figure 8:
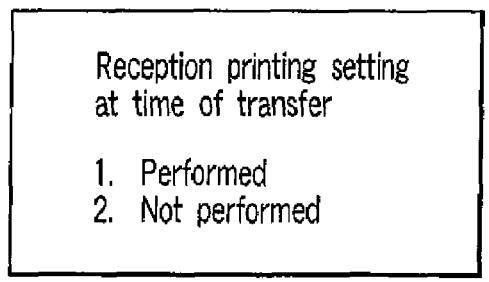
FIG. 8 is a view showing a display example of the display part when reception print setting at a time of transfer is performed in the embodiment.

When the storage destination inputted by the user is determined by the user's operation of the operation part 23a, next, a screen for setting whether printing of the facsimile data to be transferred is performed when the transfer using the TSI transfer function is performed, is displayed on the display part 23b. That is, a screen for performing reception print setting is displayed (FIG. 8). In the case where reception printing is performed, the user selects "1. performed", and in the case where the reception printing is not performed, the user selects "2. not performed".

Figure 9:
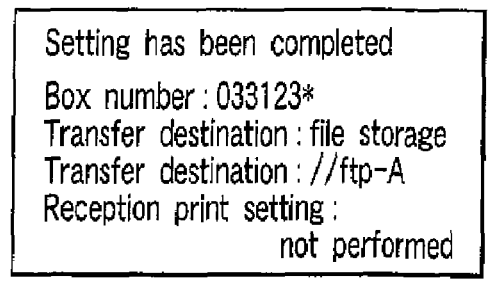
FIG. 9 is a view showing a display example of the display part when setting completion is notified in the embodiment.

After the setting of the reception printing is selected by the user's operation of the operation part 23a, the setting is determined by the input of the determination key. Then, the screen indicating the setting completion is displayed on the display part 23b (FIG. 9). At this time, the information set by the user is also displayed. In FIG. 9, it is displayed that "box number: 033123*", "transfer kind: file storage", "transfer destination: //ftp_A", and "reception printing: performed" have been set. By the display at this time, the user can confirm the setting.

When the setting of the box as stated above is performed, the user sees, for example, a telephone number of a transmission source printed on the reception management report (journal) and can assign a name to the box for using the TSI transfer function.

FIG. 10 shows an example of the table 14a to store the setting of the transfer of facsimile data using the TSI transfer function, which has been explained while FIG. 3 to FIG. 9 are used as examples. As shown in FIG. 10, in the table 14a, "transfer kind", "transfer destination" and "reception print setting" are stored correspondingly to the "box number" as the name of the box. A box number in which "*" does not exist indicates that the complete match between the box number and the number included in the TSI data at the time when the after-mentioned transfer processing using the TSI transfer function is performed has been set. A box number in which "*" is added to the front of the box number indicates that the backward match to the number included in the TSI data at the time when the transfer processing is performed has been set. Further, a box number in which "*" is added to the last of the box number indicates that the forward match to the number included in the TSI data at the time when the transfer processing is performed has been set.

Incidentally, although "transfer kind", "transfer destination" and "reception print setting" are stored in the table 14a correspondingly to "box number", no limitation is made to this. In addition to these settings, a setting as to whether the transfer is print-outputted at the time of transfer, a setting as to whether the transfer is notified, a setting of the notification destination, and the like may be stored in the table 14a. The settings as stated above are stored in the table 14a by the user's operation of the operation part 23a.

Besides, the number of transfer destinations set in the box is not limited to one, and plural transfer destinations may be set. In this case, plural transfer kinds of FAX, iFAX, E-mail, and file storage may be set for each of them, or an arbitrary combination thereof may be set.

Figure 11:
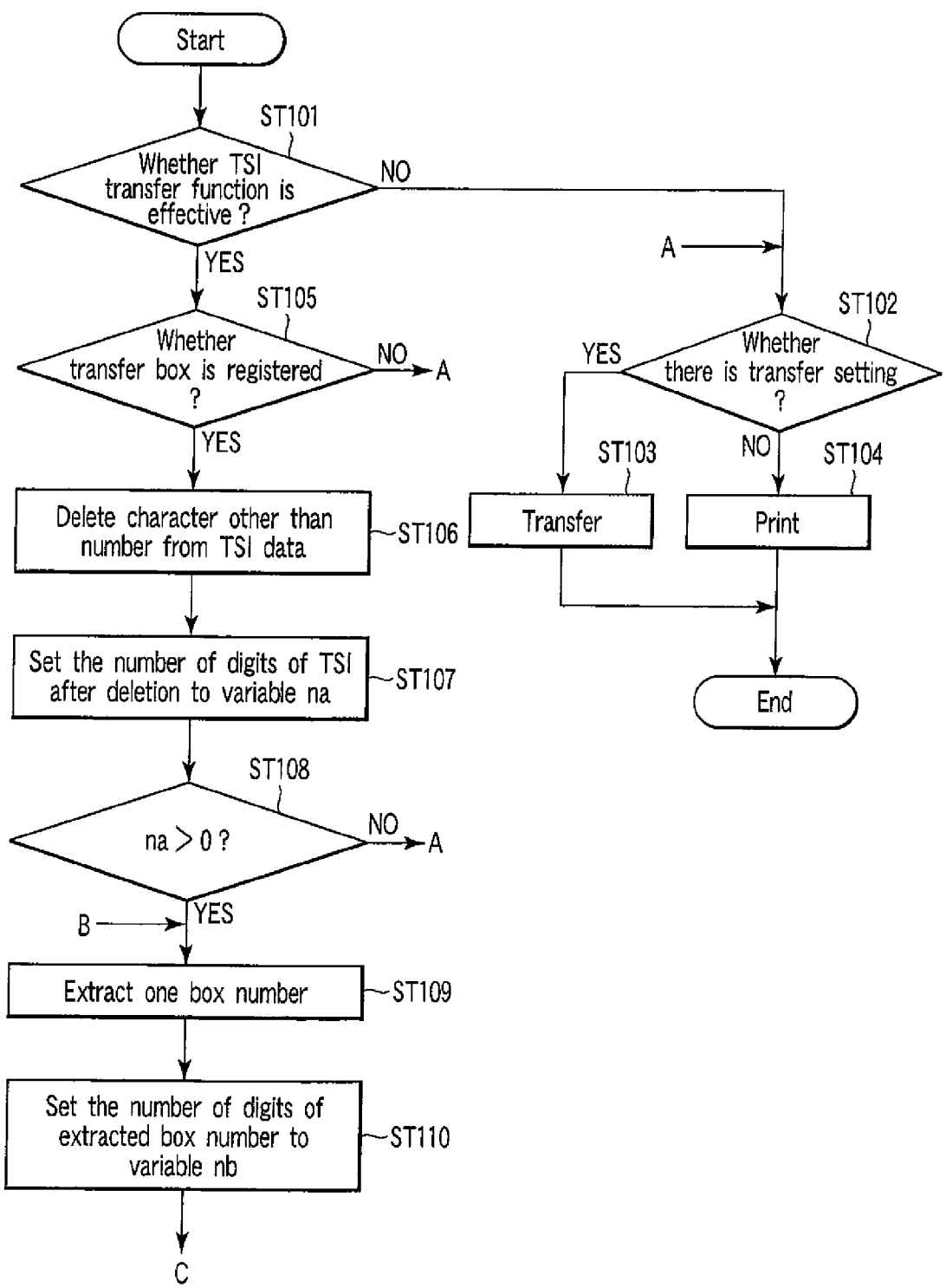
FIG. 11 is the first half of a flowchart showing a transfer processing of facsimile data in the embodiment.
Figure 12:
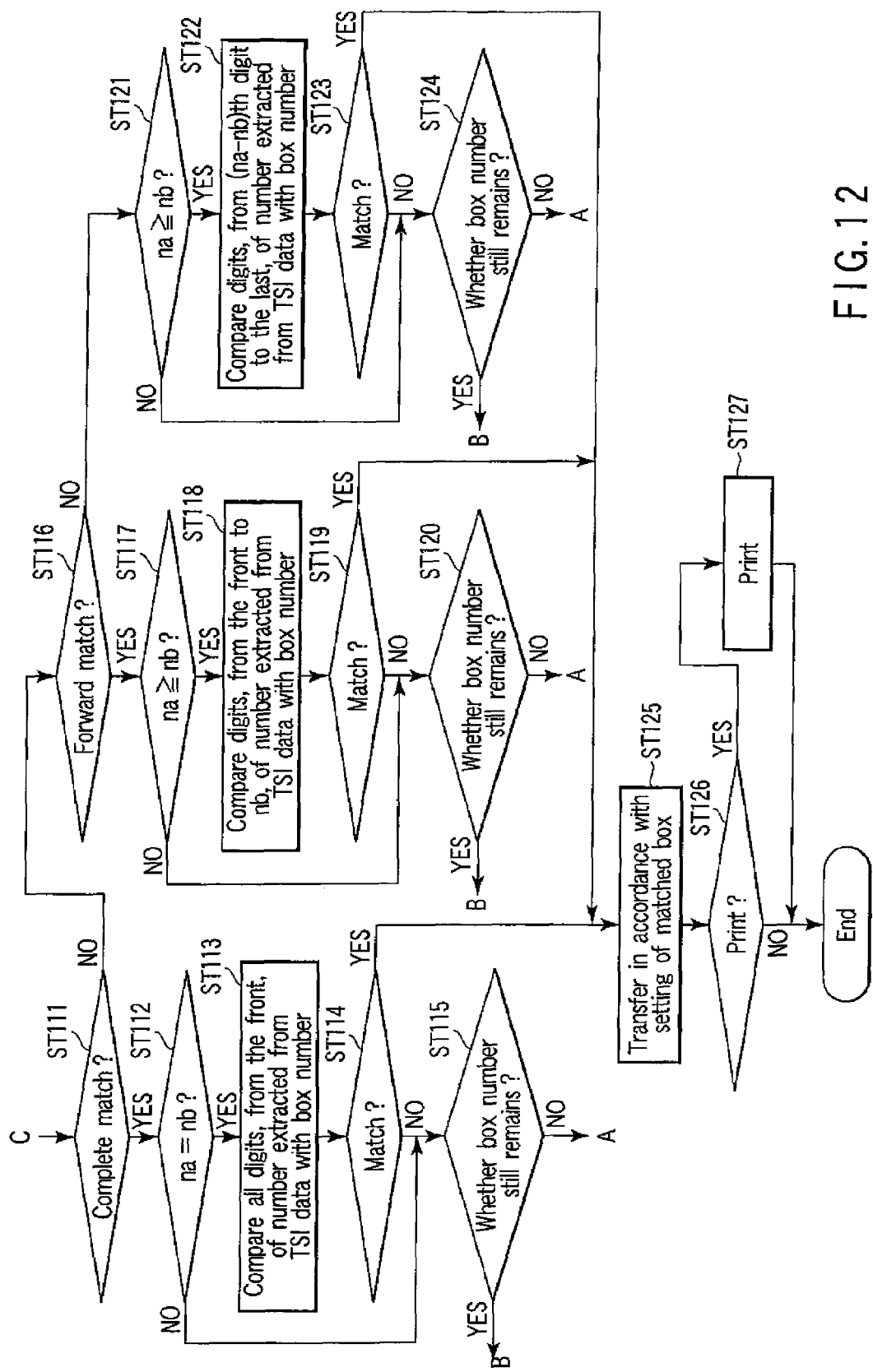
FIG. 12 is the latter half of the flowchart showing the transfer processing of the facsimile data in the embodiment.

Next, a description will be given to the transfer processing executed by the CPU 11 when the facsimile data is received. FIG. 11 and FIG. 12 are flowcharts showing the main part of this transfer processing. FIG. 11 is the flowchart showing the first half of the transfer processing, and FIG. 12 is the flowchart showing the last half of the transfer processing.

First, it is judged whether or not a setting that the TSI transfer function becomes effective has been made (ST101). This judgment is made based on the setting of the second setting part 14c. Then, when the setting that the TSI transfer function becomes effective has not been made (NO at ST101), it is judged whether or not a transfer setting exists (ST102). This judgment is made based on the setting of the first setting part 14b. When it is judged that the transfer setting exists (YES at ST 102), the received facsimile data is transferred to the set transfer destination (ST 103). When the transfer setting has not been made (NO at ST102), the received facsimile data is printed (ST 104). Incidentally, since the processing from step ST102 to ST104 is a conventional processing, the detailed description will be omitted.

When the setting that the TSI transfer function is effective has been made (YES at ST101), it is judged whether or not the registration of the box has been made (ST105). This judgment is made according to whether or not the box is registered in the table 14a. When it is judged that the registration of the box has not been made (NO at ST105), the processing returns to step ST102, and the foregoing processing of ST102 to ST104 is performed. When it is judged that the registration of the box has been performed (YES at ST105), characters other than numbers are deleted from the TSI data (ST106). There is a case where data such as a character other than a number are included in the TSI. That is, only the number indicating the telephone number of the transmission source is extracted from the TSI data by this processing.

Then, the number of digits of the number extracted from the TSI data including only the number is set to a variable na (ST107). The setting of the number of digits is temporarily stored in the RAM 13. Then, it is judged whether or not the variable na is larger than 0 (ST108). When it is judged that the variable na is not larger than 0 (NO at ST108), the processing proceeds to step ST102, and the foregoing processing of ST102 to ST104 is performed. In the case where the variable na is not larger than 0, the variable na is 0. When the variable na is 0, that is, when the number of digits of the number extracted from the TSI data is 0, it is unnecessary to perform the processing subsequent to step ST109 in which the number extracted from the TSI data is compared with the box number.

On the other hand, when it is judged that the variable na is larger than 0 (YES at ST108), one box number is extracted (ST109). This processing is performed such that for example, the first box number is selected from boxes registered in the table 14a, and the selected box number is extracted. Then, the number of digits of the extracted box number is set to the variable nb (ST110). The setting of the number of digits is temporarily stored in the RAM 13.

When the variable na and the variable nb are set in the manner as stated above, based on the extracted box number, it is judged whether or not the setting of comparison between the number included in the TSI data and the box number is complete match (ST 111). Specifically, a judgment is made based on how the box number is registered. That is, when "*" is not detected in the box number, the CPU 11 judges that it is the complete match, and when "*" is detected, a judgment is made that it is not the complete match.

When the judgment is made that it is the complete match (YES at ST111), next, it is judged whether or not the variable na matches the variable nb (ST112). That is, the number of digits of the box number matches the number of digits of the number extracted from the TSI data. In the case where it is judged that the variable na matches the variable nb (YES at ST112), the number extracted from the TSI data and the box number are compared with each other for all digits from the beginning of the digits (ST113). Then, based on this comparison result, it is judged whether or not the number extracted from the TSI data and the box number match each other (ST114). In the case where it is judged that they do not match each other (NO at ST 114), or in the case where it is judged at step ST112 that the variable na and the variable nb do not match each other (NO at ST112), it is judged whether or not a registered box number remains in the table 14a (ST115). When it is judged that no registered box number remains (NO at ST115), the processing returns to step ST102, and the foregoing processing of ST102 to ST104 is performed.

At the judgment of the step ST111, in the case where the judgment is made that it is not the complete match (NO at ST111), a judgment is made as to whether it is the forward match (ST116). That is, a judgment is made as to whether "*" is added to the front of the box number or "*" is added to the last thereof. In the case where "*" is added to the front, the CPU 11 judges that it is the forward match, and in the case where "*" is added to the last, the CPU judges that it is not the forward match, that is, the backward match.

In the case where the judgment is made at step ST116 that it is the forward match, a judgment is made as to whether the variable na is not smaller than the variable nb (ST117). In the case where the judgment at step ST117 is YES, a comparison is made between the number extracted from the TSI data and the box number from the beginning to the digit indicated by the variable nb as to whether numbers at the respective digits match each other (ST118). Based on this comparison result, it is judged whether or not the front of the number extracted from the TSI data and the box number match each other (ST119). In the case where a judgment is made that they do not match each other (NO at ST119), or in the case of NO at step ST117, it is judged whether or not a registered box number still remains in the table 14a (ST120). When it is judged that no registered box number remains (NO at ST 120), the processing returns to step ST102, and the foregoing processing of ST102 to ST104 is performed. Incidentally, in the case of NO at step ST117, the processing of step ST118 and ST119 is passed, because in the case where the variable na is smaller than the variable nb, the number extracted from the TSI data and the box number do not match each other.

In the case where a judgment is made at step ST116 that it is not the forward match (that is, a judgment is made that it is the backward match), a judgment is made as to whether the variable na is not smaller than the variable nb (ST121). In the case where the judgment at this step ST121 is YES, a comparison is made as to whether numbers of the number extracted from the TSI data at the respective digits from the digit indicated by na-nb to the last match the numbers of the box number at the respective digits (ST122). Based on this comparison result, it is judged whether or not the latter part of the number extracted from the TSI data and the box number match each other (ST123). In the case where a judgment is made that they do not match each other (NO at ST123), or in the case of NO at step ST121, a judgment is made as to whether or not a registered box number still remains in the table 14a (ST124). When it is judged that no registered box number remains (NO at ST124), the processing returns to step ST102, and the foregoing processing from ST102 to ST104 is performed. Incidentally, in the case of NO at step ST121, the processing of step ST122 and ST123 is passed, because in the case where the variable na is smaller than the variable nb, the number extracted from the TSI data does not match the box number.

In the case where it is judged at step ST115, ST120 and ST124 that the registration of a box number (box number which has not been compared with the number extracted from the TSI data) still remains in the table 14a (YES at ST115, ST120, ST124), return is made to the processing of step ST109, and the processing of ST109 to ST124 is performed. That is, the above processing is repeated until the box number matching the number extracted from the TSI data is found, or the comparison between the number extracted from the TSI data and all the box numbers registered in the table 14a is ended.

On the other hand, when it is judged that there is a box number completely matching the number extracted from the TSI data (YES at ST114), when it is judged where there is a forward match box number (YES at ST119), or when it is judged that there is a backward match box number (YES at ST123), the received facsimile data is transferred based on the transfer setting set in the box number (ST125). Further, it is judged whether or not the received facsimile data is printed (ST126). This judgment is made based on the print setting set in the table 14a correspondingly to the box. When the print setting is "performed" (YES at ST126), printing is performed (ST127). When the printing is performed as stated above, or when the print setting corresponding to the box is "not performed" (NO at ST126), the processing is ended.

Next, the operation at the time when the MFP 1 transfers facsimile data by the TSI transfer function will be described.

When the MFP 1 receives facsimile data, from another fax, in which data of the telephone number of the transmission source and the like are included in the TSI data, in the case where the TSI transfer function is effective, first, it is judged whether or not a box number is registered in the table 14*a*. As shown in FIG. 10, plural box numbers are registered in the table 14*a*. Accordingly, data of characters other than numbers are deleted from the data included in the TSI data, and data indicating the telephone number is extracted. Then, a comparison is made between the number indicated by the data and the number of the box number.

Specifically, one box number is selected from the table 14*a*, and the number after the deletion and the box number are compared with each other. This comparison is performed until a match occurs, or all box numbers registered in the table 14*a* are selected.

When the number extracted from the TSI data and the number of the box number are compared, in the case where the mark of "*" is not contained in the box number, the number extracted from the TSI data and the number of the box number are compared with each other for all digits.

However, in the case where "*" is added to the last of the box number, a comparison is made as to whether only the front of the number extracted from the TSI data matches the box number. That is, the front (having the same digits as those of the box number from the beginning) of the number extracted from the TSI data and the number of the box number are compared for the respective digits. For example, as shown in FIG. 10, when the name of "033123*" is assigned to the selected box, the first six-digit number of the number extracted from the TSI data and "033123" are compared at the respective digits. Information of the country code, area, city, ward and the like is included in the front of the number indicated by the TSI data. Accordingly, when the box number of the forward match is registered in the table 14*a*, the transmission destination to which the received facsimile data is transferred can be classified by the country, area, city, ward and the like.

In the case where "*" is added to the front of the box number, a comparison is made as to whether only the latter part of the number extracted from the TSI data matches the box number. That is, the latter part (having the same digits as those of the box number from the last) of the number extracted from the TSI data and the number of the box number are compared with each other at the respective digits. For example, as shown in FIG. 10, when the name of "*8899" is assigned to the selected box, the last four digits of the number extracted from the TSI data and "8899" are compared at the respective digits. Here, it is supposed that the telephone number starting from the area code is registered after "*" as the name in the table 14*a*, and the country code is contained in the TSI data from the transmission source. Then, since the country code is not the object to be compared with the box number, the facsimile data is transferred to the transmission destination set in the box number. Accordingly, it is possible to prevent such a situation that the transfer function of the facsimile data by the TSI transfer function does not work since the country code is contained in the TSI data. Thus, by assigning "*" to the front, the box with the name of the number in which the number located at the first of the telephone number and indicating the country, city or the like is omitted can be registered in the table 14*a*.

According to the MFP 1 of this embodiment, when the box for performing the transfer by the TSI transfer function is registered in the table 14*a*, as a method of comparing the telephone number included in the TSI data with the name of the box, the complete match, forward match, or backward match can be selected.

Incidentally, in the embodiment, although the description has been given to the case where the mark indicating the forward match and the backward match is "*", no limitation is made to this. A previously set symbol, character or the like may be used instead of "*".

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a first judgment part configured to judge whether a transfer function based on transmission subscriber identification data is effective when facsimile data to which transmission subscriber identification data is added is received;
   a second judgment part configured to judge whether, when the first judgment part judges that the transfer function is effective, at least one box is registered in a table that stores a box to which a number indicating an identification number of a transmission source is assigned as a name and in which transfer setting of the facsimile data is associated therewith and are stored, and a box to which a number indicating a part of an identification number of a transmission source and a specified symbol added to the front or last of the number are assigned as a name and in which transfer setting of the facsimile data is stored;
   a selection part configured to select one box from the table in a case where the second judgment part judges that the box is registered in the table;
   a third judgment part configured to judge whether the symbol is included in the name of the box selected by the selection part;
   a first comparison part configured to compare the identification number of the transmission source as the name of the selected box with a number indicated by the transmission subscriber identification data for all digits when the third judgment part judges that the symbol is not included;
   a fourth judgment part configured to judge whether the symbol is added to the front or the last of the number assigned as the name to the selected box and indicating the part of the identification signal of the transmission source when the third judgment part judges that the symbol is included;
   a second comparison part configured to compare the number indicating the part of the identification signal of the transmission source with a last number of the number indicated by the transmission subscriber identification data for same digits as those of the number indicating the part of the identification signal when the fourth judgment part judges that the symbol is added to the front of the number indicating the part of the identification signal of the transmission source; and a transfer part configured to transfer the received facsimile data according to the transfer setting of the selected box in a case where the compared numbers match each other based on a comparison result in the first comparison part or the second comparison part.

2. The image forming apparatus according to claim 1, further comprising a third comparison part configured to compare the number indicating the part of the identification signal of the transmission source with a front number of the number indicated by the transmission subscriber identification data for same digits as those of the number indicating the part of the identification signal when the fourth judgment part judges that the symbol is added to the last of the number indicating the part of the identification signal of the transmission source, wherein the transfer part transfers the received facsimile data based on a comparison result in the third comparison part.

3. The image forming apparatus according to claim 2, wherein in a case where the compared numbers of digits do not match each other based on the comparison result of one of the first comparison part, the second comparison part, and the third comparison part, a processing of selecting the box registered in the table is repeated until a comparison between names of all boxes registered in the table and the transmission subscriber identification data is ended.

4. The image forming apparatus according to claim 2, further comprising a delete part configured to delete data other than a number from the transmission subscriber identification data, wherein the number indicated by the transmission subscriber identification data and compared in the first comparison part, the second comparison part and the third comparison part is the number after the data other than the number is deleted by the delete part.

5. The image forming apparatus according to claim 1, wherein the symbol is an asterisk.

6. An image forming apparatus comprising:

first judgment means for judging whether a transfer function based on transmission subscriber identification data is effective when facsimile data to which transmission subscriber identification data is added is received;

second judgment means for judging whether, when the first judgment means judges that the transfer function is effective, at least one box is registered in a table that stores a box to which a number indicating an identification number of a transmission source is assigned as a name and in which transfer setting of the facsimile data is associated therewith and are stored, and a box to which a number indicating a part of an identification number of a transmission source and a specified symbol added to the front or last of the number are assigned as a name and in which transfer setting of the facsimile data is stored;

selection means for selecting one box from the table in a case where the second judgment means judges that the box is registered in the table;

third judgment means for judging whether the symbol is included in the name of the box selected by the selection means;

first comparison means for comparing the identification number of the transmission source as the name of the selected box with a number indicated by the transmission subscriber identification data for all digits when the third judgment means judges that the symbol is not included;

fourth judgment means for judging whether the symbol is added to the front or the last of the number assigned as the name to the selected box and indicating the part of the identification signal of the transmission source when the third judgment means judges that the symbol is included;

second comparison means for comparing the number indicating the part of the identification signal of the transmission source with a last number of the number indicated by the transmission subscriber identification data for same digits as those of the number indicating the part of the identification signal when the fourth judgment means judges that the symbol is added to the front of the number indicating the part of the identification signal of the transmission source; and transfer means for transferring the received facsimile data according to the transfer setting of the selected box in a case where the compared numbers match each other based on a comparison result in the first comparison means or the second comparison means.

7. The image forming apparatus according to claim 6, further comprising third comparison means for comparing the number indicating the part of the identification signal of the transmission source with a front number of the number indicated by the transmission subscriber identification data for same digits as those of the number indicating the part of the identification signal when the fourth judgment means judges that the symbol is added to the last of the number indicating the part of the identification signal, wherein the transfer means transfers the received facsimile data based on a comparison result in the third comparison means.

8. The image forming apparatus according to claim 7, wherein in a case where the compared numbers of digits do not mach each other based on the comparison result of one of the first comparison means, the second comparison means, and the third comparison means, a processing of selecting the box registered in the table is repeated until a comparison between names of all boxes registered in the table and the transmission subscriber identification data is ended.

9. The image forming apparatus according to claim 7, further comprising delete means for deleting data other than a number from the transmission subscriber identification data, wherein the number indicated by the transmission subscriber identification data and compared in the first comparison means, the second comparison means and the third comparison means is the number after the data other than the number is deleted by the delete means.

10. The image forming apparatus according to claim 1, wherein the symbol is an asterisk.

11. An image forming method of transmitting received facsimile data in an image forming apparatus, comprising:

judging whether a transfer function based on transmission subscriber identification data is effective when facsimile data to which transmission subscriber identification data is added is received;

judging whether, when a judgment is made that the transfer function is effective, at least one box is registered in a table that stores a box to which a number indicating an identification number of a transmission source is assigned as a name and in which transfer setting of the facsimile data is associated therewith and are stored, and a box to which a number indicating a part of an identification number of a transmission source and a specified symbol added to the front or last of the number are assigned as a name and in which transfer setting of the facsimile data is stored;

selecting one box from the table in a case where a judgment is made that the box is registered in the table;

judging whether the symbol is included in the name of the selected box;

comparing the identification number of the transmission source as the name of the selected box with a number indicated by the transmission subscriber identification data for all digits when a judgment is made that the symbol is not included;

judging whether the symbol is added to the front or the last of the number assigned as the name to the selected box and indicating the part of the identification signal of the transmission source when a judgment is made that the symbol is included;

comparing the number indicating the part of the identification signal of the transmission source with a last number of the number indicated by the transmission subscriber identification data for same digits as those of the number indicating the part of the identification signal when a judgment is made that the symbol is added to the front of the number indicating the part of the identification signal of the transmission source; and transferring the received facsimile data according to the transfer setting of the selected box in a case where the compared numbers match each other based on a result of the comparison.

12. The image forming method according to claim 11, further comprising:

comparing the number indicating the part of the identification signal of the transmission source with a front number of the number indicated by the transmission subscriber identification data for same digits as those of the number indicating the part of the identification signal when a judgment is made that the symbol is added to the last of the number indicating the part of the identification signal of the transmission source.

13. The method according to claim 12, further comprising:

repeating, in a case where the compared numbers of digits do not match each other based on the comparison result, a processing of selecting the box registered in the table until a comparison between names of all boxes registered in the table and the transmission subscriber identification data is ended.

14. The method according to claim 12, further comprising:

deleting data other than a number from the transmission subscriber identification data before the comparison of the transmission subscriber identification data is performed.

15. An image forming apparatus comprising:

setting means for setting a box for transfer of received facsimile data;

reception means for receiving facsimile data to which transmission subscriber identification data is added;

input means for inputting a partial number of a number indicated by the transmission subscriber identification data as a number of the box and a transmission destination of the received facsimile data;

comparison means for comparing the transmission subscriber identification data added to the facsimile data received by the reception means with the number of the box inputted by the input means;

selection means for selecting one of complete match, backward match, and forward match as a condition under which a comparison is made by the comparison means; and transmission means for transferring the received facsimile data to the transmission destination inputted to the box in a case where the comparison by the comparison means is made under the condition selected by the selection means, and a judgment is made that the transmission subscriber identification data added to the facsimile data received by the reception means matches the number of the box inputted by the input means.

16. The image forming apparatus according to claim 15, wherein in a case where the forward match is selected by the selection means, a specified number is added to the last of the number of the box.

17. The image forming apparatus according to claim 16, wherein the comparison means compares the number indicated by the transmission subscriber identification data with the number of the box for same digits.

18. The image forming apparatus according to claim 15, wherein in a case where the backward match is selected by the selection means, a specified number is added to the front of the number of the box.

19. The image forming apparatus according to claim 18, wherein the comparison means compares the number indicated by the transmission subscriber identification data with the number of the box for same digits.

20. The image forming apparatus according to claim 15, further comprising delete means for deleting data other than a number from the transmission subscriber identification data added to the facsimile data received by the reception means.

* * * * *